United States Patent
Sheaffer et al.

(10) Patent No.: US 6,593,930 B1
(45) Date of Patent: Jul. 15, 2003

(54) METHOD AND APPARATUS TO EXECUTE A MEMORY MAINTENANCE OPERATION DURING A SCREEN BLANKING INTERVAL

(75) Inventors: Gad S. Sheaffer, Haifa (IL); Opher D. Kahn, Zichron-Yacov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,803

(22) Filed: Dec. 16, 1999

(51) Int. Cl.[7] .................................................. G09G 5/39
(52) U.S. Cl. ...................... 345/531; 345/213; 711/106; 365/222
(58) Field of Search .................. 345/501, 531, 345/519, 213; 713/400, 500, 501, 502, 600; 711/106; 365/222

(56) References Cited

U.S. PATENT DOCUMENTS

| | | | | |
|---|---|---|---|---|
| 3,996,585 A | * | 12/1976 | Hogan et al. | 345/441 |
| 4,091,417 A | * | 5/1978 | Nieson | 380/232 |
| 4,475,124 A | * | 10/1984 | Ankeny et al. | 345/213 |
| 4,751,574 A | | 6/1988 | Mogi et al. | 358/147 |
| 5,265,231 A | * | 11/1993 | Nuwayser | 365/222 |
| 5,651,131 A | * | 7/1997 | Chesley | 711/106 |
| 6,118,462 A | * | 9/2000 | Margulis | 345/501 |
| 6,313,844 B1 | * | 11/2001 | Yamashita | 345/531 |

OTHER PUBLICATIONS

Patent Abstracts of Japan, vol. 1995, No. 06, Jul. 31, 1995 & JP 07 067146 A (Toshiba Corp), Mar. 10, 1995.

* cited by examiner

*Primary Examiner*—Kee M. Tung
(74) *Attorney, Agent, or Firm*—Kenyon & Kenyon

(57) ABSTRACT

A memory controller, in one embodiment of the present invention, can control the execution of a memory maintenance operation. A screen blanking event counter can output a first signal. A memory maintenance state circuit can be coupled to the screen blanking event counter to receive the first signal. The memory maintenance state circuit can output a memory maintenance enable signal.

35 Claims, 5 Drawing Sheets

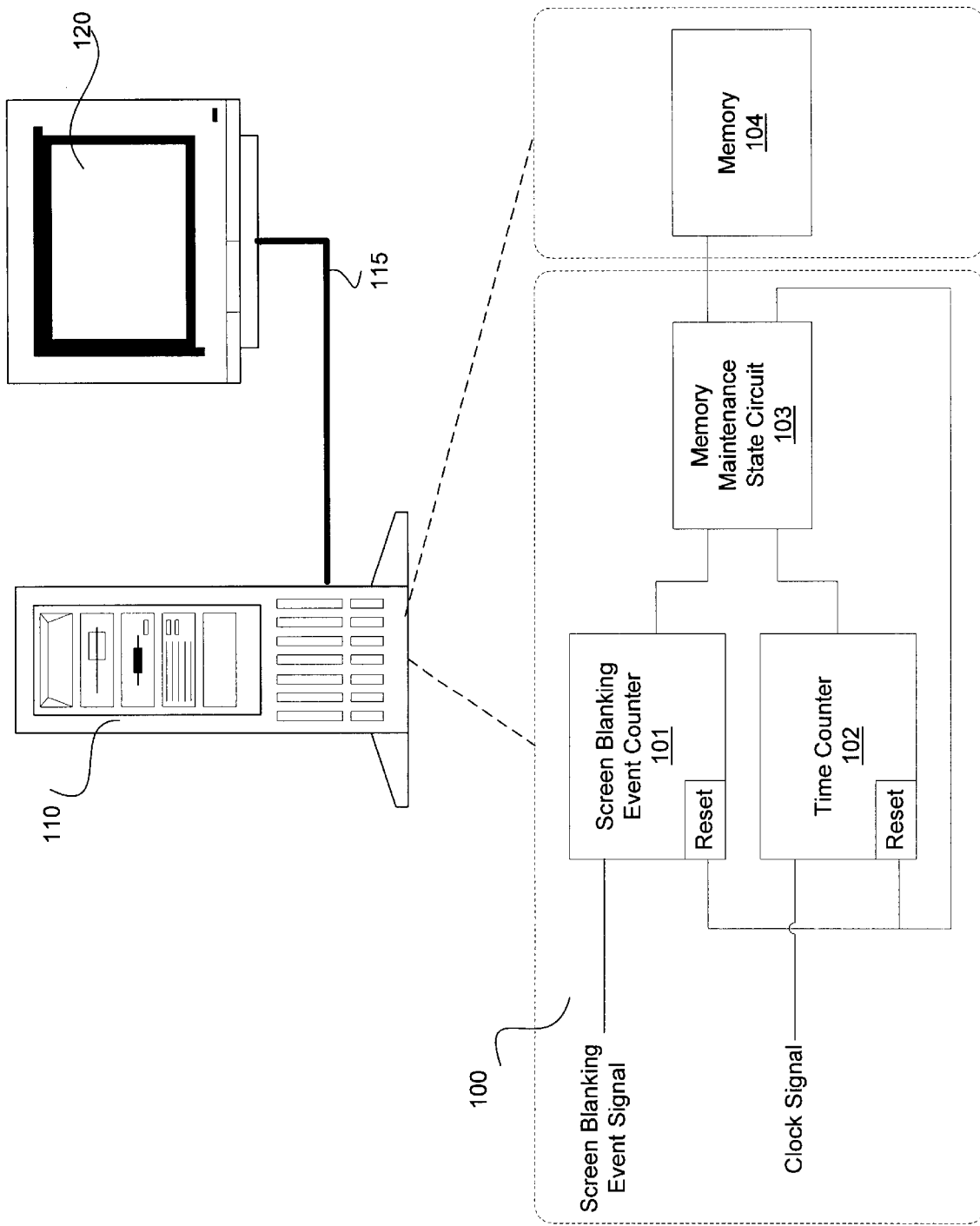

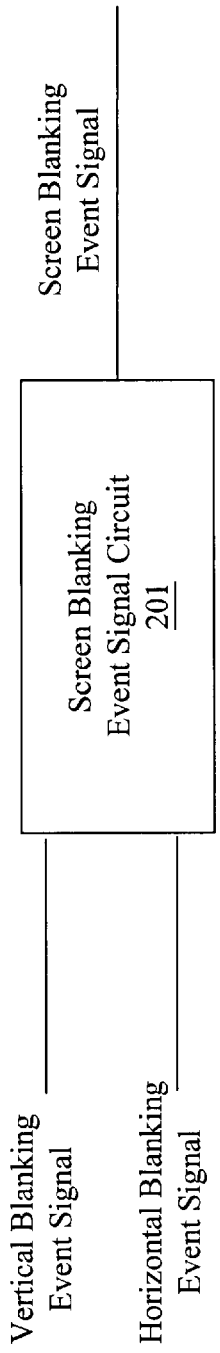
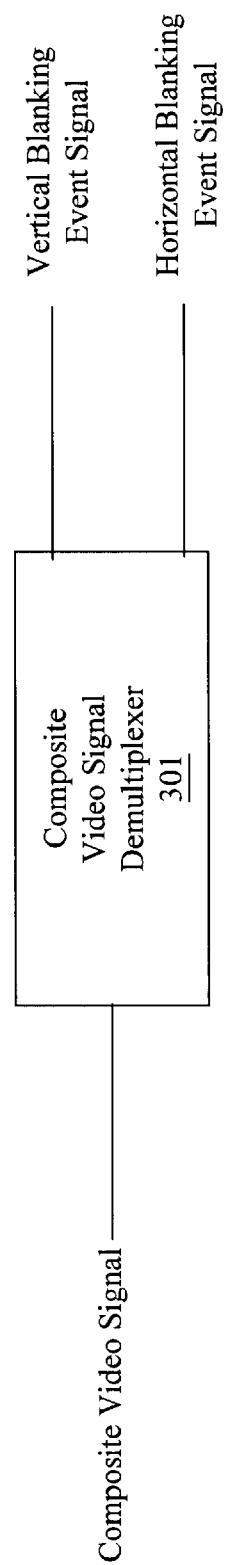

METHOD AND APPARATUS TO EXECUTE A MEMORY MAINTENANCE OPERATION DURING A SCREEN BLANKING INTERVAL

FIELD OF THE INVENTION

The present invention provides a method and apparatus to control a memory maintenance operation. More particularly, the initiation of a memory maintenance operation is controlled to provide for execution of the memory maintenance operation during a screen blanking event.

BACKGROUND OF THE INVENTION

In known electronic systems, memory maintenance operations must be performed within set intervals of time. If memory maintenance operations are not performed within a specified period of time, memory data can be lost, memory performance can become degraded, etc. Known methods and apparatus to control the execution of memory maintenance operations include the use of a timer (e.g., a counter that counts a clock signal) to initiate a memory maintenance operation. The timer can generate a memory maintenance enable signal that initiates the execution of the memory maintenance operation. The timer generates the memory maintenance enable signal at least once within a set period of time (e.g., at least every 15 microseconds).

In a computer system that uses Rambus® memory, operation of the Rambus® memory system has memory maintenance operations that cause the memory to shut down and not serve memory requests for periods of time. Rambus® technology is licensed by Rambus Inc. of Mountain View, Calif. Rambus® memory maintenance operations include memory controller temperature calibration, memory device temperature calibration, memory controller current calibration, memory device current calibration, DLL (Dynamic Link Layer) refresh for device in Nap mode, memory refresh, etc. Rambus® memory maintenance operations can occur relatively infrequently. In known Rambus® implementations, certain memory maintenance operations may occur every 100 milliseconds and have durations of up to 2.5 microseconds.

During Rambus® memory maintenance operations, the Rambus® memory is shut down with respect to reading and writing data to the Rambus® memory. In other words, the Rambus® memory does not service memory requests during memory maintenance operations. As used to describe embodiments of the present invention, a memory maintenance operation encompasses a memory operation during which the memory does not service memory request (e.g., memory reads, memory writes, etc.). In systems servicing high-bandwidth, real-time data streams (e.g., displaying video data, capturing video data, processing cable television transmissions, etc.), a known method of addressing memory service shutdowns is to utilize memory buffers. During memory shutdowns, a memory buffer can receive data written to the memory. Data can also be read from a memory buffer during a memory shutdown. Typically, the size of a buffer is based at least on the worst-case period of memory service shutdown and the memory bandwidth required by devices and/or applications writing data to, and reading data from, memory.

The use of a buffer to service memory requests during a memory shutdown consumes silicon area resources. For example, a buffer can be implemented as a dedicated portion of a processor, as a dedicated portion of a Rambus® controller, etc. Buffer operations (e.g., keeping a read buffer sufficiently full, keeping a write buffer sufficiently empty, etc.) can disadvantageously affect system performance by generating high-priority requests to write data to, or read data from, the buffer.

In view of the foregoing, it can be appreciated that a substantial need exists for a method and apparatus which can control the initiation of memory maintenance operations in an efficient and effective manner.

SUMMARY OF THE INVENTION

For one embodiment of the present invention, a memory controller can initiate the execution of a memory maintenance operation based at least in part on a first signal from a screen blanking event counter. A memory maintenance state circuit can be coupled to the screen blanking event counter to receive the first signal. The memory maintenance state circuit can output a memory maintenance enable signal to initiate the execution of the memory maintenance operation.

BRIEF DESCRIPTION OF THE DRAWINGS

FIG. 1A shows a system in accordance with an embodiment of the present invention.

FIG. 2 illustrates an apparatus to generate a screen blanking event signal in accordance with an embodiment of the present invention.

FIG. 3 shows an apparatus to generate blanking event signals in accordance with an embodiment of the present invention.

DETAILED DESCRIPTION

Figure 1B:
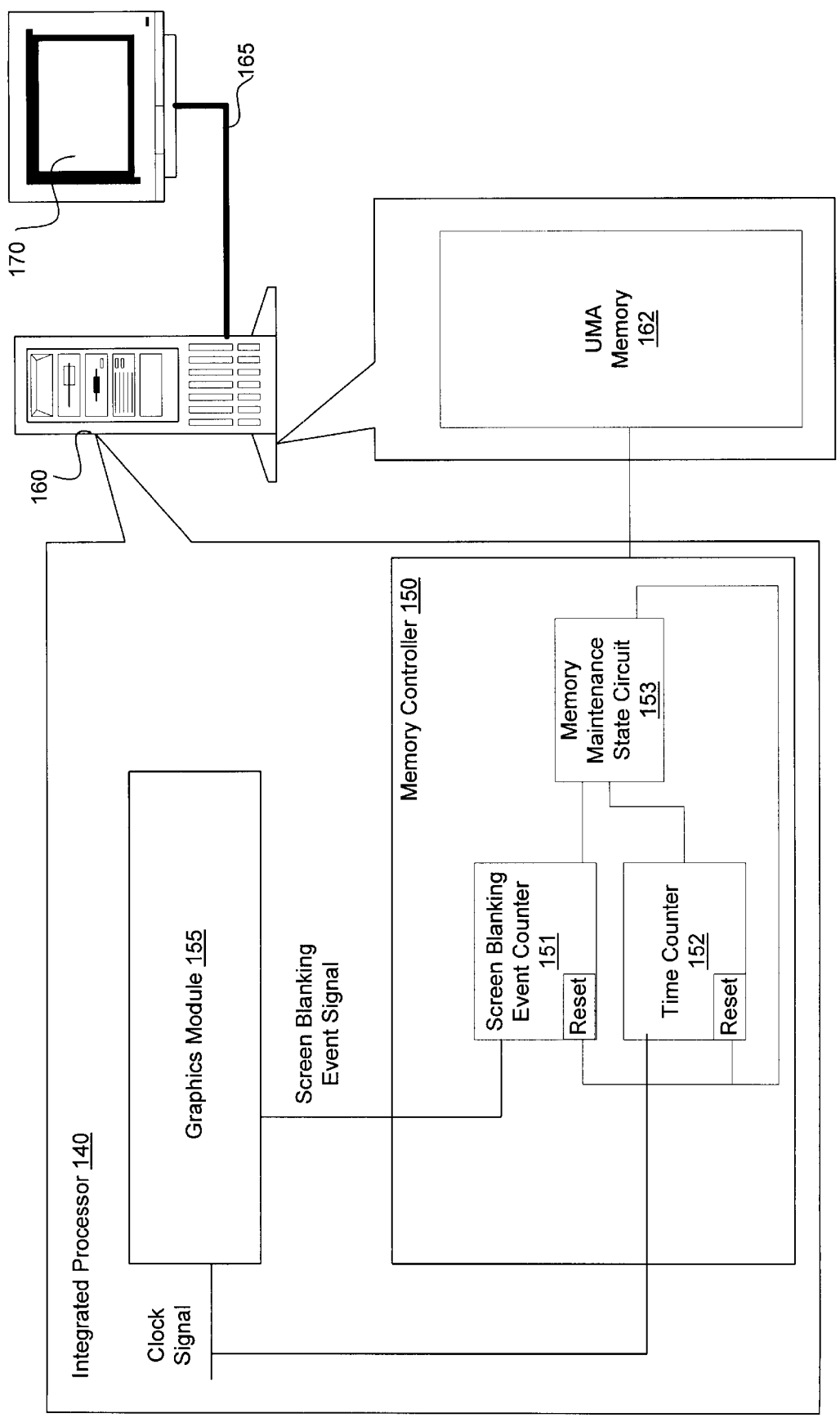
FIG. 1B shows a system in accordance with an embodiment of the present invention.

Embodiments including methods and apparatus for controlling the execution of memory maintenance operations to occur during screen blanking events are described. In the following description, for purposes of explanation, numerous specific details are set forth to provide a thorough understanding of the present invention. One skilled in the art can appreciate that the present invention may be practiced without these specific details. In other instances, known structures and devices are shown in block diagram form. Furthermore, it can be appreciated by one skilled in the art that the specific sequences in which methods are presented and performed are illustrative and it is contemplated that the sequences can be varied and still remain within the spirit and scope of the present invention.

A video monitor can display an image upon a video screen by tracing a stream of electrons across the screen in a row by row fashion from top to bottom. As the electron stream impacts the screen, different colors can be displayed at each point (e.g., pixel) along a row. A horizontal blanking interval is the period of time during which an electron gun shuts off to return from the right side of a video monitor or television (TV) screen to the left side to start painting a new line of video. See Newton's Telecom Dictionary 382 (15th ed. 1999). A vertical blanking interval is the period of time between video frames in which the electron gun shuts off to return to the upper left hand corner of the screen to start painting a new video frame. See Newton's Telecom Dictionary 852. During the horizontal blanking interval and the vertical blanking interval, real-time pixel display data need not be transmitted to the video display.

FIG. 1A shows a system in accordance with an embodiment of the present invention. Computer 10 is coupled to a video monitor 120 via a monitor interface 115. Computer 110 can include a processor, such as the Pentium® III processor manufactured by Intel Corp. of Santa Clara, Calif. In another embodiment, the processor can be an Application Specific Integrated Circuit (ASIC). Computer 110 can include a memory 104 coupled to the processor. The memory 104 can be any device adapted to store digital information, such as Dynamic Random Access Memory (DRAM), Rambus® memory, flash memory, a hard disk, an optical digital storage device, or a combination thereof, etc. The monitor interface 115 can be an analog RGB (red, green, blue) interface or a digital monitor interface such as DVI (Digital Video Interactive).

Computer 110 includes memory controller 100. In one embodiment, memory controller 100 can initiate the execution of a memory maintenance operation during a screen blanking interval. In another embodiment, memory controller 100 can cause a memory maintenance operation to be executed after the first of: (1) a set number of screen blanking intervals have occurred; and (2) a set period of time has expired.

Memory controller 100 includes a screen blanking event counter 101 and a time counter 102, each of which are coupled to memory maintenance state logic 103.

Memory controller 100 is coupled to memory 104. As used to describe embodiments of the present invention, coupled means connected directly or indirectly. Screen blanking event counter 101 can generate a first trigger signal upon counting a set number of screen blanking events. The first trigger signal can be received by the memory maintenance state logic 103. Time counter 102 can generate a second trigger signal upon counting a set amount of time (e.g., a set number of clock ticks). The second trigger signal can be received by the memory maintenance state logic 103 and can ensure that a memory maintenance operation will be executed at least once within a set period of time. Each of the first trigger signal and the second trigger signal can indicate that a memory maintenance operation is to be executed. In one embodiment, when a trigger signal transitions from low (e.g., a logical one, a voltage of 1.0 volts) to high (e.g., a logical zero, a voltage of 1.8 volts), it indicates that a memory maintenance operation is to be executed.

The memory maintenance state circuit 103 can generate a memory maintenance enable signal based at least in part on the received first trigger signal and the received second trigger signal. In one embodiment, the memory maintenance state circuit includes an OR circuit that receives the first trigger signal and the second trigger signal. In another embodiment, the memory maintenance state circuit includes a bimultiplexer that receives the first trigger signal and the second trigger signal. The memory maintenance enable signal can initiate the execution of a memory maintenance operation. A counter reset signal can be generated by the memory maintenance state circuit 103 based at least in part on to the completion of a memory maintenance operation with respect to memory 104. The counter reset signal may simultaneously reset each of the screen blanking event counter 101 and the time counter 102.

In one embodiment, memory 104 is Rambus® memory. In another embodiment, memory 104 includes any memory that has a period of time during which a memory maintenance operation must be performed, memory service is interrupted, a memory shutdown occurs, etc.

Memory controller 100 can include hardware, firmware, software, a combination thereof, etc. Memory maintenance state circuit 103 can be coupled to a circuit that controls the timing and execution of a memory maintenance operation. In one embodiment, for example, memory controller 100 can be part of a Rambus® ASIC Controller. In another embodiment, memory controller 100 can be part of a processor, such as an application specific processor, a general purpose processor, etc.

The screen blanking event counter 101 can receive a screen blanking event signal, such as a horizontal blanking event signal, a vertical blanking event signal, etc. A horizontal blanking event signal can indicate the onset of a horizontal blanking interval. A vertical blanking event signal can indicate the onset of a vertical blanking interval. In one embodiment, the horizontal screen blanking event signal is high during the horizontal blanking interval and low at other times. In such an embodiment, the transition of the horizontal screen blanking event signal from low to high indicates the onset of the horizontal blanking interval.

The screen blanking event counter 101 can generate an indication to execute a memory maintenance operation after a set number of screen blanking events are counted. The number of screen blanking events that can be counted prior to the generation of the memory maintenance operation execution indication can vary based on system design variables and requirements, such as the rate at which horizontal blanking events occur, the duration of a horizontal screen blanking event, the rate at which vertical blanking intervals occur, the duration of a vertical blanking interval, the duration of a memory maintenance operation, the maximum time allowed between memory maintenance operations, etc.

In one embodiment, the screen blanking event counter 101 counts a set number of vertical screen blanking events prior to generating an indication to execute a memory maintenance operation. The number of vertical screen blanking events to be counted can be a function of the screen refresh frequency. The number to be counted can be determined dynamically based at least in part on the refresh frequency used at the moment. In another embodiment, the number to be counted can be determined statically based at least in part on the lowest refresh frequency supported by a system.

In another embodiment, the screen blanking event counter 101 counts a set number of horizontal screen blanking events prior to generating an indication to execution a memory maintenance operation. The number of horizontal screen blanking events to be counted can be a function of the screen refresh frequency and the screen resolution. The number to be counted can be determined dynamically based at least in part on the refresh frequency and screen resolution used at the moment. In another embodiment, the number to be counted can be determined statically based at least in part on the lowest refresh frequency and lowest screen resolution supported by a system.

The execution of different memory maintenance operations can be controlled to be executed during different screen blanking events. In typical video-related systems, the duration of a vertical blanking interval is longer than the duration of a horizontal blanking interval. The duration and frequency of the horizontal blanking interval and the vertical blanking interval can depend upon video display variables and requirements such as the refresh rate (i.e., the vertical scan frequency, the vertical scan rate), the size of the video display, the number of pixels displayed, the number of scanning lines, the number of pixels per scanning row, etc. Vertical blanking intervals can have durations of several hundred microseconds (e.g., 200 to 600 microseconds). Horizontal blanking intervals can have durations on the order of 10 microseconds (e.g., 2 to 11 microseconds). Memory maintenance operations that require less time can be controlled to be executed during horizontal blanking intervals. Operations that require greater amounts of time can be controlled to be executed during vertical blanking intervals.

In one embodiment, a memory maintenance operation is performed during every screen blanking event, e.g., during every vertical blanking interval. In one such embodiment, the screen blanking event counter 101 is set to output a first trigger signal (e.g., a screen blanking event trigger signal) at every first count of the onset of the screen blanking event. In another embodiment in which a memory maintenance operation is to be performed during every screen blanking event, the screen blanking event signal is a first trigger signal. In a further embodiment, the screen blanking event signal is a memory maintenance enable signal. In such embodiments, when the screen blanking event signal indicates the onset of a screen blanking event (e.g., by going high, going low, pulsing, etc.), a memory maintenance operation is enabled and executed during the screen blanking event.

The time counter 102 can generate a second trigger signal after a set amount of time has been counted. In current Rambus® systems, a set of memory maintenance operations may be performed at least every 100 milliseconds. In other systems employing memory, different periods of time can be set as the maximum amount of time that elapses between a memory maintenance operation. The second trigger signal (e.g., a time trigger signal) can ensure that a memory maintenance operation is triggered at least once within a required period of time, e.g., at least every 100 milliseconds in known Rambus® systems.

In one embodiment, screen blanking event signals are not generated at certain times, such as when a video display in not active (e.g., the video monitor is turned off, the video display is blanked as part of a screen saver mode, the video monitor is in a power conservation mode, etc.), when a video data stream is not being received, when a video stream is not being read out of memory, etc. Accordingly, memory maintenance operations can be triggered by the time counter when no indications of screen blanking events are received by an embodiment of a memory controller 100.

FIG. 1B shows a system in accordance with an embodiment of the present invention. Computer 160 can be coupled to a video display 170 via a monitor interface 165. Computer 160 can include an integrated processor 140, which can be coupled to a UMA memory 162. In accordance with one embodiment of the present invention, a UMA memory can store the frame buffer (e.g., a section of memory used to store an image to be displayed on a video monitor and/or parts of the image that lie outside the limits of the display, etc.). Integrated processor 140 can include a graphics module 155 (e.g., a graphics engine, etc.), and a memory controller 150. In one embodiment, the integrated processor can include a processor core, such as a Pentium® processor core. In one embodiment, each of the graphics module 155 and memory controller 150 receive a clock signal, and graphics module 155 sends a screen blanking event signal to memory controller 150. Memory controller 150 can include a screen blanking event counter 151 to receive the screen blanking event signal and a time counter 152 to receive the clock signal. Each of screen blanking event counter 151 and time counter 152 can be coupled to memory maintenance state logic 153.

FIG. 2 illustrates an apparatus to generate a screen blanking event signal in accordance with an embodiment of the present invention. A vertical blanking event signal and a horizontal blanking event signal can be received by screen blanking event signal circuit 201. The screen blanking event signal circuit 201 can generate a screen blanking event signal based at least in part on a received vertical blanking event signal and/or a horizontal blanking event signal. In one embodiment, screen blanking event circuit 201 includes a logical OR circuit. In another embodiment, screen blanking event circuit 201 includes a multiplexer. Screen blanking event signal logic 201 can include hardware, firmware, software, a combination thereof, etc. In one embodiment, for example, screen blanking event signal circuit 201 can be part of a Rambus® ASIC Controller. In another embodiment, screen blanking event signal circuit 201 can be part of a processor, such as an application specific processor, a general purpose processor, etc.

In one embodiment, the screen blanking signal circuit 201 selectively passes a screen blanking event signal, such as the vertical blanking event signal, the horizontal blanking event signal, etc. In another embodiment, a memory maintenance operation can be performed during either a vertical blanking interval or a horizontal blanking interval. Thus, in such an embodiment, the screen blanking event signal circuit 201 performs a logical OR operation upon a received vertical blanking event signal and a received horizontal blanking event signal to generate a composite screen blanking event signal. In another embodiment, a memory maintenance operation causes a worst-case latency to memory that is of greater duration that the horizontal blanking interval but of lesser duration than the vertical blanking interval. Accordingly, the screen blanking signal circuit 201 can generate the screen blanking event signal based at least in part on the vertical blanking event signal.

FIG. 3 shows an apparatus to generate screen blanking event signals in accordance with an embodiment of the present invention. In one embodiment of the present invention, a memory can receive video signal data. For example, a computer system can include a video capture device that outputs a composite video signal, and video signal data received from the video capture device can be stored in memory (e.g., on a hard drive, on a Digital Versatile Disc (DVD), etc.). Operation specifications of the memory can require that a memory maintenance operation be performed periodically. To enable performance of the memory maintenance operations during a period corresponding to a screen blanking interval of the received composite video signal, a composite video signal demultiplexer 301 receives a composite video signal. The composite video signal demultiplexer 301 can generate a vertical blanking event signal and/or a horizontal blanking event signal based at least in part upon the received composite video signal. In accordance with an embodiment of the present invention, a memory maintenance operation can then be performed based at least in part upon the generated vertical blanking event signal and/or the generated horizontal blanking event signal.

Figure 4:
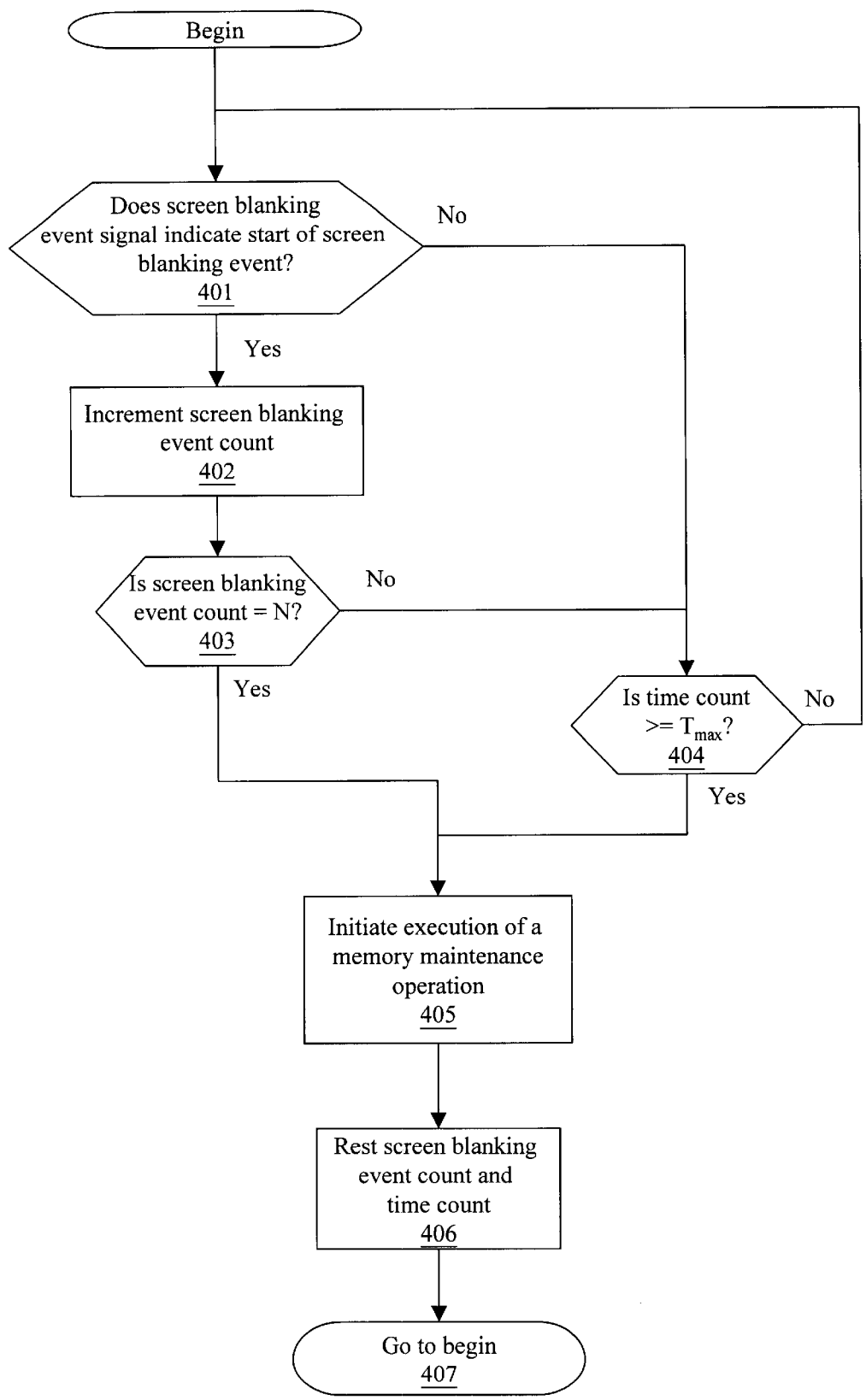
FIG. 4 illustrates exemplary steps executed in accordance with an embodiment of the present invention.

FIG. 4 illustrates exemplary steps executed in accordance with an embodiment of the present invention. A memory controller in accordance with an embodiment of the present invention (e.g., the memory controller 100 of FIG. 1) can initiate a memory maintenance operation during a screen blanking event after a set number (e.g., N) of screen blanking events have occurred. The memory controller also can initiate a memory maintenance operation after a certain amount of time has expired since completion of the previous memory maintenance operation. The memory controller can receive a clock signal and a screen blanking event signal. The clock signal may be utilized by the memory controller to count time (e.g., clock ticks). The screen blanking event signal can go high at the start of a screen blanking event, can remain high during the screen blanking event, and can go low after the screen blanking event is completed.

The memory controller can include screen blanking event logic to determine whether a screen blanking event has started (e.g, by determining whether the screen blanking event signal has gone high) (step 401). If a screen blanking event has not started, the memory controller can determine whether the time count equals or exceeds the maximum time count, e.g., $T_{max}$ (step 404). If the time count does not equal or exceed the maximum time count, $T_{max}$, the memory controller can again determine whether a screen blanking event has started (loop back to step 401). If the time count equals or exceeds the maximum time count, $T_{max}$, the memory controller can initiate execution of a memory maintenance operation (step 405). Subsequent to execution of the memory maintenance operation, the screen blanking event count and time count can be reset (step 406). The memory controller then can begin to count anew screen blanking events and time (step 407).

If a screen blanking event has started, a screen blanking event count can be incremented (step 402). The screen blanking event count can be compared to a set number N (step 403). As described above, the set number N can be determined dynamically or statically. In another embodiment, the set number N is predetermined and can be preprogrammed or hardwired. If the screen blanking event count does not equal N, the memory controller can determine whether the time count equals or exceeds the maximum time count, $T_{max}$ (step 404), as described above. If the screen blanking event count equals N, the memory controller can initiate execution of a memory maintenance operation (step 405). Subsequent to execution of the memory maintenance operation, the screen blanking event count and time count can be reset (step 406). The memory controller then can begin to count anew screen blanking events and time (step 407).

Figure 5:
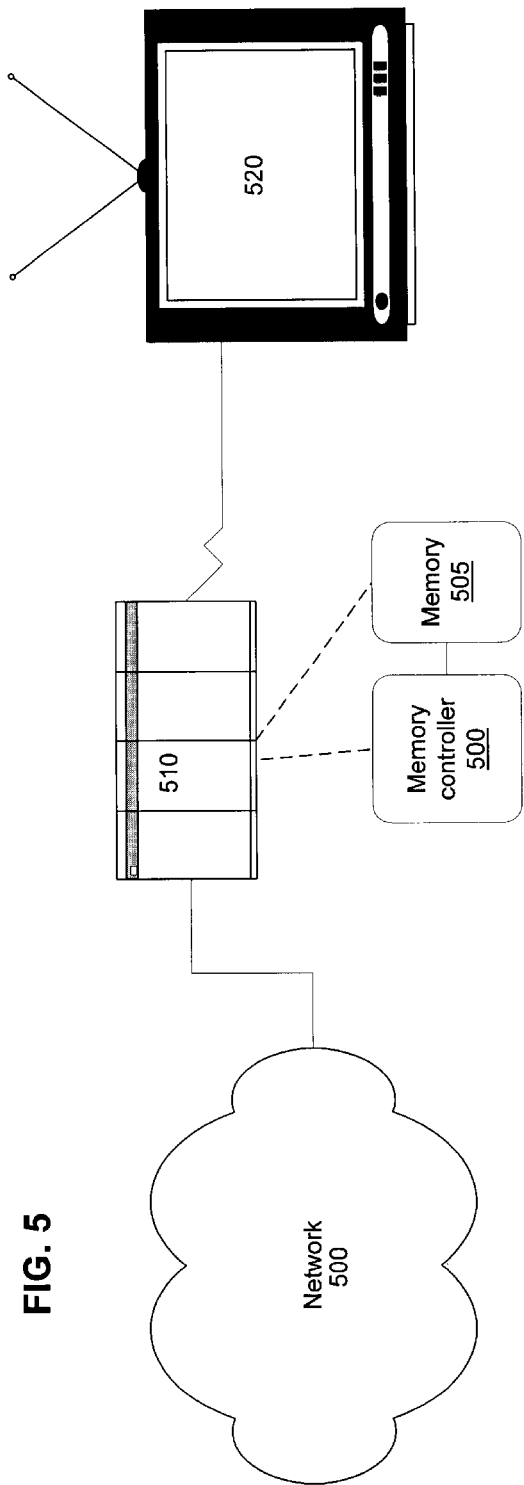
FIG. 5 shows a communications system in accordance with an embodiment of the present invention.

FIG. 5 shows a communications system in accordance with an embodiment of the present invention. Network 500 can be coupled to electronic device 510, which can be coupled to a television receiver 520. In one embodiment, network 500 is a cable television system. In another embodiment, network 500 is a communications network capable of delivering television signals, voice communications, Internet communications, a combination thereof, etc. Electronic device 510, in one embodiment, can be a cable television set-top box. Cable set-top boxes can receive television signals from a cable television network and provide a television signal to a television set. In one embodiment, electronic device 510 is a satellite television set-top box. In another embodiment, electronic device 510 can be a computing device (e.g., a computer) that can operate as a cable television set-top box. Television receiver 520 can be a television, a computer including a television signal display card, a video cassette recorder (VCR), etc.

Electronic device 510 includes a memory controller 500 in accordance with an embodiment of the present invention. Memory controller 500 is coupled to memory 505. Memory 505 can store real-time video data received from the network 500. A memory maintenance operation is performed periodically on memory 505. As is described in detail above, memory controller 500 can initiate the execution of a memory maintenance operation during a screen blanking event period of the real-time video data received from network 500. Memory 505 can also store real-time vide data that is to be read from memory and displayed on television receiver 520.

Figure 6:
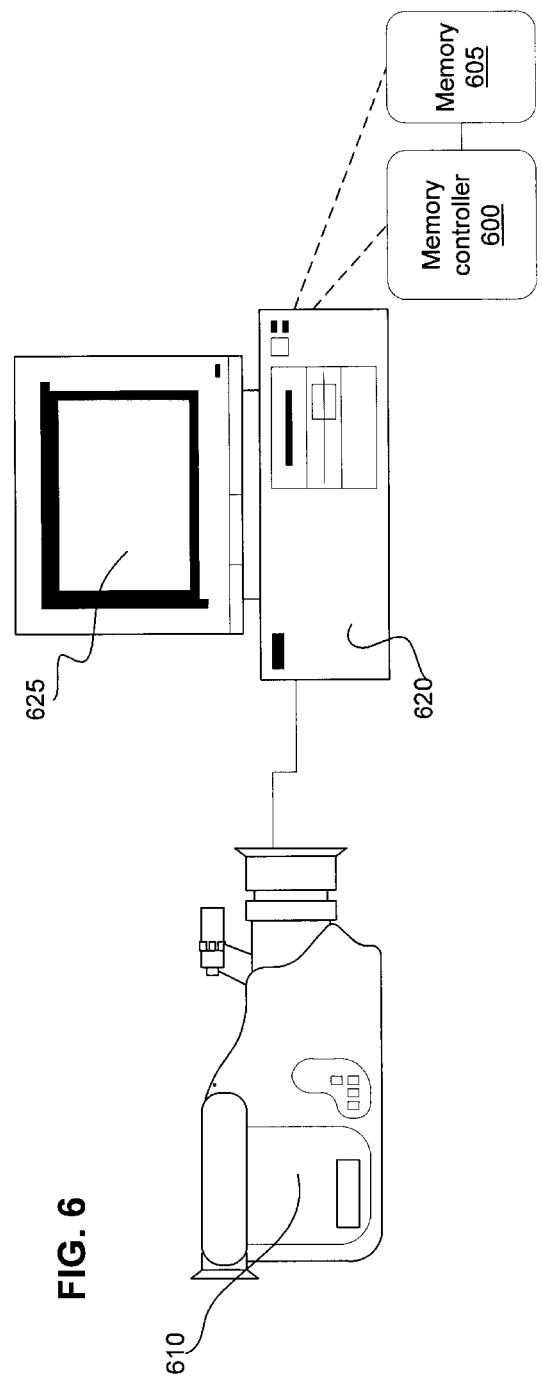
FIG. 6 shows a computing system in accordance with an embodiment of the present invention.

FIG. 6 shows a computer system in accordance with an embodiment of the present invention. Video device 610 is coupled to computer 620. Computer 620 can include a processor and a memory and can be coupled to video display 625. In one embodiment, video device 610 can be a video capture device such as a video camera. In another embodiment, video device 610 can be video display device such as a VCR, a video camera operating in a video display mode, DVD player, etc. While video device 610 is illustrated in FIG. 6 as external to the computer 620, in another embodiment video device 610 is internal to the computer (e.g., an internal DVD drive, an internal video capture device, etc.) and coupled to an internal computer bus of computer 620.

Computer 620 includes a memory controller 600 in accordance with an embodiment of the present invention. Memory controller 600 is coupled to memory 605. UMA memory 605 can store real-time video data received from the video device 610. A memory maintenance operation is performed periodically on UMA memory 605. As is described in detail above, memory controller 600 can initiate the execution of a memory maintenance operation during a screen blanking event period of real-time video data received from video device 610. UMA memory 605 can also store real-time vide data that is to be read from UMA memory 605 and displayed on video display 625.

In one embodiment, instructions to perform a method in accordance with an embodiment of the present invention when executed are stored on a computer-readable medium and distributed as software. The computer-readable medium can be any device adapted to store digital information. For example, the computer-readable medium includes a portable magnetic disk, such as a floppy disk; or a Zip® disk, manufactured by the Jomega Corporation of Roy, Utah; a Compact Disk Read Only Memory (CD-ROM); a ROM; etc. The computer-readable medium can be distributed to a user that has a processor suitable for executing instructions to be executed. The term "instructions to be executed" is meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention advantageously allow a memory maintenance operation to be executed during a screen blanking interval. In an embodiment where the period between maintenance operations is longer than the period between multiple screen blanking intervals, a memory maintenance operation can be executed during a screen blanking interval after a set number of screen blanking intervals have occurred. Embodiments of the present invention can provide for execution of the memory maintenance operations during a period of time when memory service demands (e.g., reading video display data, writing video display data) are less sensitive to memory service latency (e.g., during a screen blanking event).

What is claimed is:

1. An apparatus to control the execution of a memory maintenance operation, comprising:

a screen blanking event counter to count a number of screen blanking events and to output a first signal based on a pre-determined number of counted screen blanking events;

a memory maintenance state circuit, coupled to said screen blanking event counter, to output a memory maintenance enable signal in response to the first signal.

2. The apparatus of claim 1, further comprising a second counter, coupled to the memory maintenance state circuit, to output a second signal.

3. The apparatus of claim 2, wherein the second counter is a time counter.

4. The apparatus of claim 1, wherein the memory maintenance state circuit to output a counter reset signal.

5. The apparatus of claim 1, further comprising a screen blanking event signal circuit coupled to the screen blanking event counter.

6. The apparatus of claim 1, further comprising a video signal demultiplexer coupled to the screen blanking event counter.

7. The apparatus of claim 1, wherein the screen blanking event counter is a vertical blanking interval counter.

8. A method to control the execution of a memory maintenance operation, comprising:

receiving a number of screen blanking event signals, wherein each screen blanking event signal represents a screen blanking event; and initiating the execution of a memory maintenance operation based on a predetermined number of screen blanking event signals received.

9. The method of claim 8, wherein the screen blanking event signal is a vertical blanking interval signal.

10. The method of claim 8, wherein receiving a screen blanking event signal includes:

receiving a video signal; and generating a screen blanking event signal based at least on the received video signal.

11. The method of claim 10, wherein generating a screen blanking event signal based at least on the received video signal includes demultiplexing a screen blanking event signal from the received video signal.

12. The method of claim 8, wherein receiving a screen blanking event signal includes:

receiving a vertical blanking event signal and a horizontal blanking event signal;

generating a composite screen blanking event signal based at least in part on the received vertical blanking event signal and the received horizontal blanking event signal.

13. A method to control the execution of a memory maintenance operation, comprising:

counting a number of screen blanking event trigger signals received, each trigger signal representing a screen blanking event;

receiving a time trigger signal;

initiating the execution of a memory maintenance operation based at least in part on receiving a pre-determined number of screen blanking event trigger signals counted and the timer trigger signal.

14. The method of claim 13, wherein receiving a screen blanking event trigger signal includes:

receiving a plurality of screen blanking event trigger signals; and generating a memory maintenance indication based at least in part on the received plurality of screen blanking event trigger signals.

15. The method of claim 14, wherein:

receiving a plurality of screen blanking event trigger signals includes receiving a predetermined number of screen blanking events; and generating a memory maintenance enable indication includes generating the memory maintenance enable indication based at least in part on receiving the predetermined number of screen blanking events.

16. The method of claim 15, wherein the predetermined number of screen blanking event indications is determined dynamically based at least in part on a screen refresh rate.

17. The method of claim 13, wherein receiving a time trigger signal includes:

receiving a predetermined number of clock tick indications in a timing signal; and generating a memory maintenance enable indication in the time trigger signal based at least in part on the received predetermined number of clock tick indications.

18. A system to process a video signal, comprising:

an electronic device to receive the video signal, said electronic device including:

a memory to store data of the video signal; and a memory controller, coupled to the memory, to control the execution of a memory maintenance operation, the memory controller including:

a screen blanking event counter to count a number of screen blanking events and to output a first signal based on a pre-determined number of counted screen blanking events;

a second counter to output a second signal; and a memory maintenance state circuit, coupled to said screen blanking event counter and said second counter, to output a memory maintenance enable signal in response to the first signal.

19. The system of claim 18, wherein the electronic device is a television set-top box.

20. The system of claim 19, wherein the television set-top box is a cable television set-top box.

21. The system of claim 19, wherein the television set-top box is a satellite television set-top box.

22. The system of claim 18, wherein the electronic device is a computer.

23. The system of claim 22, further comprising:

a video capture device, coupled to the computer, to generate a video signal.

24. The system of claim 22, further comprising:

a video display device, coupled to the computer, to receive the video signal.

25. The system of claim 18, wherein the memory is a unified memory architecture memory.

26. An apparatus comprising:

a memory; and an integrated processor, coupled to said memory, said integrated processor including:

a graphics module, a memory controller, coupled to said graphics module, the memory controller including:

a screen blanking event counter to count a number of screen blanking events and to output a first signal based on a pre-determined number of counted screen blanking events;

a second counter to output a second signal; and a memory maintenance state circuit, coupled to said screen blanking event counter and said second counter, to output a memory maintenance enable signal in response to the first signal.

27. The apparatus of claim 26, wherein the memory is a unified memory architecture memory.

28. A machine-readable medium having stored thereon a set of instructions, which if executed by a machine cause the machine to perform a method comprising:

receiving a number of screen blanking event signals; and initiating the execution of a memory maintenance operation based at least in part on a pre-determined number of screen blanking event signals received.

29. The medium of claim 28, wherein the screen blanking event signal is a vertical blanking interval signal.

30. An apparatus comprising:

display logic to output a display signal that includes at least one blanking interval; and memory control logic to receive a blanking interval notice from said display logic, said memory control logic to responsively schedule memory maintenance operations during said at least one blanking interval, wherein the blanking interval notice represents a plurality of blanking intervals.

31. The apparatus of claim 30 wherein said display logic comprises:

screen blanking indicator generation logic to output said blocking interval notice in the form of a first trigger signal;

maintenance timer logic to output a second trigger signal periodically at a predetermined maintenance interval; and said memory control logic to trigger maintenance operations in response to either said first trigger signal or said second trigger signal.

32. The apparatus of claim 31 wherein said memory control logic is to reset both said screen blanking indicator generation logic and said maintenance timer logic when a maintenance operation is performed.

33. The apparatus of claim 32 wherein said screen blanking indicator generation logic comprises a screen blanking event counter to output said first trigger signal responsive to a predetermined number of blanking events.

34. The apparatus of claim 33 wherein said predetermined number is dynamically determined based at least in part on a refresh frequency.

35. A system comprising:

a display device;

a processor coupled to the display device;

a memory coupled to the processor;

display logic to output a display signal that includes at least one blanking interval; and memory control logic coupled to receive a blanking interval notice from said display logic, said memory control logic to schedule memory maintenance operations during said at least one blanking interval, the blanking interval notice is to represent a plurality of blanking intervals.

* * * * *